United States Patent Office 3,512,293
Patented May 19, 1970

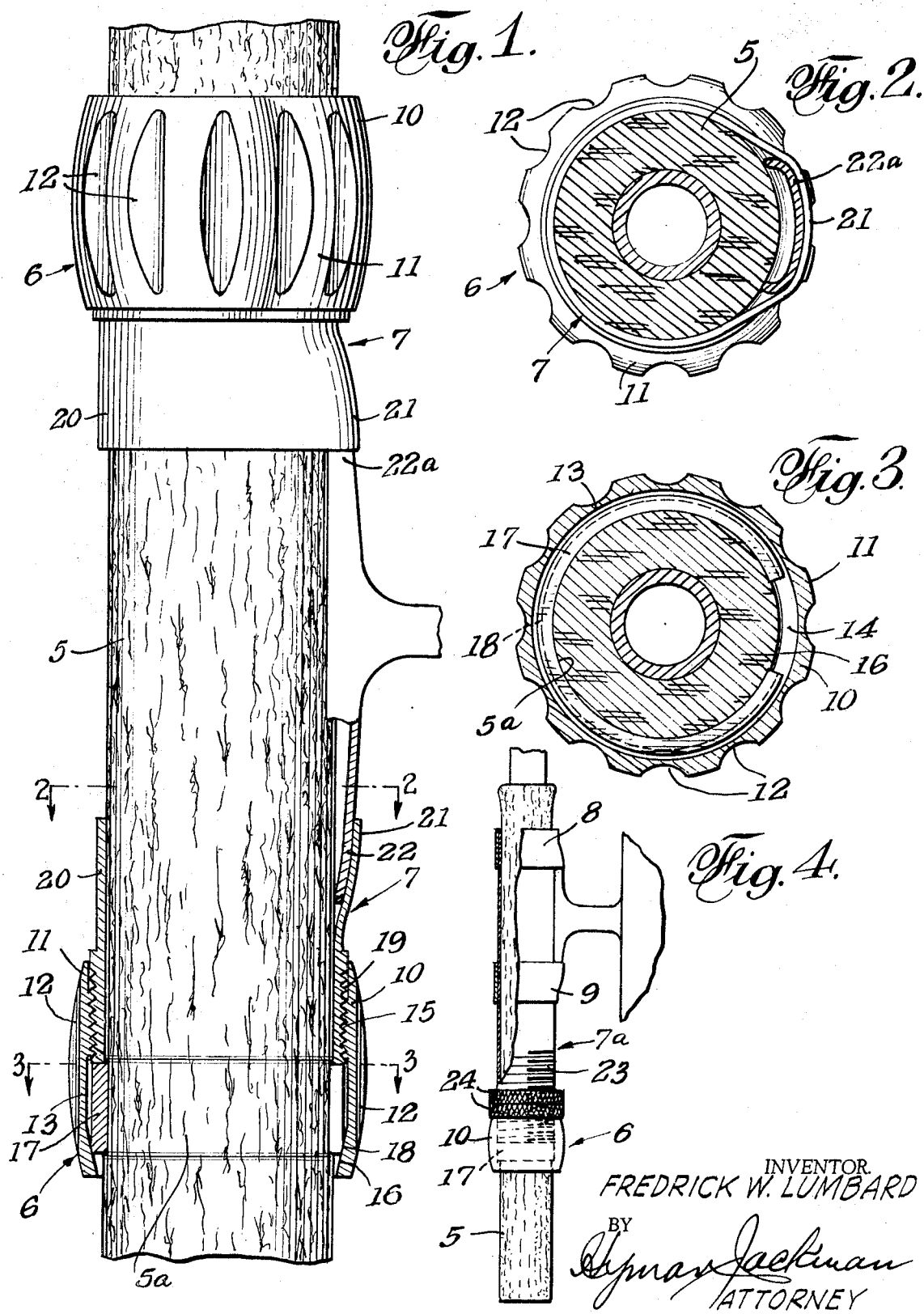

3,512,293
FISHING REEL MOUNTING MEANS
Frederick W. Lumbard, South Pasadena, Calif., assignor to Featherweight Products, Glendale, Calif., a corporation of California
Filed July 30, 1968, Ser. No. 748,762
Int. Cl. A01k 87/06
U.S. Cl. 43—22      4 Claims

ABSTRACT OF THE DISCLOSURE

A collet chuck for gripping and compressing the cork handle grip of a fishing rod and provided with a tubular member that has retention engagement with a reel seat base for adjustably mounting a fishing reel on the handle grip.

BACKGROUND OF THE INVENTION

Field of the invention

Fishing tackle, particularly means for mounting a fishing reel in a position selected by the user on an elongated cork or similarly compressible handle grip.

Description of the prior art

None of the art known to the applicant provides fishing reel mounting means that is especially effective in connection with a cork or similar handle, i.e., a handle that because of its compressibility is adapted for being firmly engaged by a constricted spring collet and, in the process, compressing the cork surrounded by the collet to a size smaller than the normal size thereof. Thus, there is provided a seat in a non-metallic handle that insures against inadvertent longitudinal displacement of the reel-mounting means.

Patents representative of the art are: 1,980,316; 2,029,-188; and 2,076,628; all of which mount the reel on tubular members which commonly are smooth and in no instance are disclosed as being compressible, as is cork, for instance.

SUMMARY OF THE INVENTION

Mounting means for a fishing reel on the compressible, preferably cork, handle grip 5 of a fishing rod comprising, generally, a collet chuck 6 for gripping said handle grip and provided with a tubular member 7 or 7a, the former being adapted for direct retention engagement with a reel seat base for adjustably securing a fishing reel at a desired position on the handle grip, and the latter being adapted to mount the reel by means of opposed sleeves 8, 9 engaged with the opposite ends of the reel seat base.

An object of the present invention is to provide reel-mounting means of the character referred to above, whereby the seat base of the reel may be slid to a predetermined position and without the aid of tools, firmly secured simply by tightening a collet chuck around a cork handle grip to hold the same engaged with at least one end of the reel base.

Another object of the invention is to mount the reel on a sleeve slidingly engaged over the handle grip and to adjustably secure said sleeve to the handle by a collet chuck that compresses said grip.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, preferred embodiments of the present invention, which are given by way of illustration or example only.

BRIEF DESCRIPTION OF THE DRAWING

In the drawing, like reference characters designate similar parts in the several views.

FIG. 1 is a broken side view of a fishing rod handle provided with one embodiment of the invention, shown partly in elevation and partly in longitudinal section.

FIGS. 2 and 3 are cross-sectional views as taken, respectively, on the lines 2—2 and 3—3 of FIG. 1.

FIG. 4, to a reduced scale, is a partly broken side view of another embodiment of the invention.

DESCRIPTION OF THE PREFERRED EMBODIMENTS

The collet chuck 6 is shown as comprising a nut 10 having an outer surface 11 provided with a plurality of longitudinal finger-engageable flutes 12 representative of means facilitating finger-rotation of the sleeve. As shown in FIGS. 1 and 3, said nut has an inner cylindrical surface 13 substantially larger than the diameter of the handle grip over which said nut is engaged, an annular space 14 being defined between the handle grip and said surface 13. At one end of the nut 6, an internal thread 15 extends longitudinally from the surface 13 to one end edge of the nut, and at the opposite end of said nut an internal frusto-conical surface 16 extends from the surface 13 to the other end edge of the nut. Said surface 16 comprises a constriction within the hollow of the nut.

A split spring collet 17 is loosely fitted within the space 14, is externally larger than the internal diameter of the threads 15 and the frusto-conical surface 16, and is internally large enough to loosely fit over the handle 5. At the outer corner of the collet, where the same engages the surface 16, a chamfer 18 is provided, the same engaging the surface 16.

The tubular member 7, shown in the embodiment illustrated in FIGS. 1, 2 and 3, has an internal size to slidingly fit the handle, and is provided at one end with an external thread 19 and at the other, tubular end 20, with an outwardly formed socket 21 adapted to receive an end 22 of a reel seat base, as shown in FIG. 1.

The above-described chuck 6 and member 7 are duplicated as similar but oppositely arranged assemblies on the handle 5 in longitudinally spaced relation to the described assembly. The opposite end 22a of the reel seat base is engaged with the socket 21 of said duplicate assembly, said base and the reel carried thereby being mounted on the handle grip in longitudinally adjusted position thereon when the nuts are drawn up tightly on the threads 15 and 19 to cause the collets 17, due to the wedging engagement of their chamfers 18 with the conical surfaces 16 of the nuts, to be compressed around the handle, thereby compressing said handle to a smaller size 5a than its initial size, as shown in FIG. 1.

It will be clear that merely slackening off on one of the nuts 10 and sliding the assembly of which it is a part out of engagement with the socket 21 of said assembly, enables removal of the reel. By slackening off on both nuts, the two assemblies may be adjusted along the handle and also relatively to each other to locate the reel where desired on the handle when the nuts are re-tightened.

The embodiment shown in FIG. 4 uses but one collet chuck 6, the threads thereof being engaged with the threads 23 of the elongated tubular member 7a and locked to said member by jam nuts 24. The member 7a, at its end away from the chuck 6, fixedly carries the tubular part 8, and longitudinally adjustable engagement is provided with the tubular part 9, both serving the same purpose as the end 20, i.e., engaging the opposite ends of a reel seat base, as before. The longitudinal adjustment of the reel on the handle is effected by adjusting the position of the member 7a along the handle.

It will be understood that the compressed portion or portions 5a, upon release by the expanded collet, return to their initial size.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described.

Having thus described the invention, what is claimed and desired to be secured by Letters Patent is:

1. The combination with a fishing rod having a handle formed of compressible material, of a chuck to engage the mounting portion of a fishing reel, said chuck comprising:
   a split spring collet encircling said handle,
   a nut to contract the collet into uniform compressive engagement with said handle to compress the handle to a smaller size, where engaged by the collet, than the initial size thereof, and
   a tubular member having a portion in threaded engagement with said nut, a portion in engagement with said mounting portion of the reel and a portion in endwise engagement with the collet, said nut being provided with an internal frusto-conical surface to engage the collet to force the same into the mentioned endwise engagement while compressing the collet.

2. The combination according to claim 1 in which a second chuck is provided, said chucks, in opposed longitudinally spaced relation on the handle, being engaged with opposite end portions of the reel mounting portion.

3. The combination according to claim 1 in which the tubular member comprises an elongated tube provided with a fixed part and a longitudinally adjustable part engaging said reel mounting portion.

4. The combination according to claim 1 in which the nut and the collet are provided, respectively, one with said frusto-conical surface and the other with a chamfer, the same cooperating to contract the collet upon tightening rotation of the nut relative to the tubular member.

References Cited

UNITED STATES PATENTS

| 402,594 | 5/1889 | Hook | 43—22 |
| 2,543,881 | 3/1951 | Umphlette et al. | 43—22 |

FOREIGN PATENTS

| 1,414,041 | 9/1965 | France. |
| 825,673 | 12/1959 | Great Britain. |

WARNER H. CAMP, Primary Examiner